(12) United States Patent
Conner

(10) Patent No.: US 8,610,560 B1
(45) Date of Patent: Dec. 17, 2013

(54) PRE-HAZARDOUS CONDITION WARNING SYSTEM AND METHOD

(71) Applicant: Charles Steven Conner, Lake Placid, FL (US)

(72) Inventor: Charles Steven Conner, Lake Placid, FL (US)

( * ) Notice: Subject to any disclaimer, the term of this patent is extended or adjusted under 35 U.S.C. 154(b) by 0 days.

(21) Appl. No.: 13/660,099

(22) Filed: Oct. 25, 2012

Related U.S. Application Data

(60) Provisional application No. 61/553,485, filed on Oct. 31, 2011.

(51) Int. Cl.
*G08B 1/08* (2006.01)

(52) U.S. Cl.
USPC .................. 340/539.11; 340/540; 340/573.1; 340/628; 340/584; 340/693.5; 340/693.6; 340/506

(58) Field of Classification Search
None
See application file for complete search history.

(56) References Cited

U.S. PATENT DOCUMENTS

| | | | |
|---|---|---|---|
| 3,816,648 A | 6/1974 | Noll et al. | |
| 4,398,184 A | 8/1983 | Scott et al. | |
| 5,900,815 A * | 5/1999 | Story | 340/548 |
| 6,097,429 A | 8/2000 | Seeley et al. | |
| 6,181,244 B1 * | 1/2001 | Hall et al. | 340/541 |
| 6,380,860 B1 * | 4/2002 | Goetz | 340/586 |
| 6,615,534 B1 * | 9/2003 | Smithyman et al. | 43/125 |
| 6,628,805 B1 | 9/2003 | Hansen et al. | |
| 7,109,879 B2 * | 9/2006 | Stults et al. | 340/691.1 |
| 7,158,040 B2 | 1/2007 | Morris | |
| 7,248,170 B2 | 7/2007 | DeOme et al. | |
| 2004/0135693 A1 * | 7/2004 | Schubert et al. | 340/573.1 |
| 2005/0104764 A1 * | 5/2005 | Young | 342/27 |
| 2007/0194922 A1 | 8/2007 | Nathan et al. | |
| 2011/0050434 A1 | 3/2011 | Wander | |

FOREIGN PATENT DOCUMENTS

WO   WO03063104   7/2003

* cited by examiner

*Primary Examiner* — George Bugg
*Assistant Examiner* — Matthew Taylor
(74) *Attorney, Agent, or Firm* — Allen D. Hertz, P.A.; Allen D. Hertz

(57) ABSTRACT

A system for monitoring a structure prior to and during subjection to a hazardous condition. The system includes a primary monitoring apparatus comprising a monitoring circuit and alerting circuit integrated into an enclosure. The monitoring circuit includes a sensor for detecting an individual or an animal within the area. The alerting circuit includes at least one alerting device. The alerting device can be any of audible alert, a visual alert, and a remote communications. A remote alerting apparatus includes at least one alert device. Signal communication is established between the monitoring apparatus and the alerting apparatus, wherein the primary apparatus activates the alert device(s) of the remote apparatus. The system is deployed within a structure, including placement of an alerting apparatus external to the structure. The system is activated prior to initiation of the hazardous process, monitoring the region for any living beings and emitting an alert when detected.

20 Claims, 7 Drawing Sheets

PRE-HAZARDOUS CONDITION WARNING SYSTEM AND METHOD

CROSS-REFERENCE TO RELATED APPLICATION

This Non-Provisional Utility application claims the benefit of co-pending U.S. Provisional Patent Application Ser. No. 61/553,485 filed on Oct. 31, 2011, which is incorporated herein its entirety.

FIELD OF THE INVENTION

The present disclosure generally relates to an apparatus and respective method of use for warning individuals and animals of a pending hazardous condition within a structure. More particularly, the present disclosure relates to a portable system to monitor for presence of a living animal/individual and emit an audible and visual warning when a living animal/individual is detected.

BACKGROUND OF THE INVENTION

Residential and commercial structures can undergo various hazardous procedures that are known to be potentially harmful or fatal to any living animal or individual residing within or proximate the structure.

A first exemplary hazardous procedure is a fumigation process. During a fumigation process, a structure is covered by a gas impervious material; the process is commonly referred to as tenting. Once the structure is properly prepared, a gaseous pesticide is released into the interior space of the structure. The sealed tent concentrates the poisonous gases and prevents them from escaping into the neighborhood. The process can take up to one week depending on the fumigant used, which in turn depends on the severity of infestation and size of the building.

A second exemplary hazardous procedure is a demolition process. Demolition is the tearing down of a structure. The demolition process can be completed using a variety of processes. A first demolition process utilizes a manual or mechanical destruction process, where destruction and removal of the building uses hydraulic equipment, such as cranes, excavators or bulldozers or a wrecking ball swung from a crane. Newer methods may use rotational hydraulic shears and silenced rock-breakers attached to excavators to cut or break through wood, steel, and concrete. The use of shears is especially common when flame cutting would be dangerous.

A second demolition process is referred to as implosion and utilizes explosive charges. Imploding a building is very fast—the collapse itself only takes seconds—and an expert can ensure that the building falls into its own footprint, so as not to damage neighboring structures.

The above processes are only two examples of hazardous processes, which may be subjected to a residential or commercial structure. Others may include removal of asbestos, mold, and the like. Any of these processes are considered hazardous or deadly to the health of a living animal or individual.

Therefore, it would be desirable to have a warning system to alert any living animals or individuals that might be within or adjacent to a residential or commercial structure while the structure is subjected to any hazardous process.

SUMMARY OF THE INVENTION

The present disclosure is generally directed to a portable hazardous conditions warning system, the warning system comprising:

a primary portable monitoring apparatus comprising:
a monitor enclosure comprising a contiguous wall extending upwards from a base, the contiguous wall and base forming a monitoring enclosure interior,
a power source for providing power to the system,
a system controller,
at least one motion detector in signal communication with the system controller,
at least one alert in signal communication with the system controller,
a monitor remote connection interface in signal communication with the system controller; and
a remote portable alerting apparatus comprising:
an alert enclosure comprising a contiguous wall extending upwards from a base, the contiguous wall and base forming an alert enclosure interior,
an alert remote connection interface for receiving signal communication from the monitor remote connection, and
at least one alert in signal communication with the alert remote connection.

In a second aspect, the portable monitoring apparatus further comprises a battery for providing portable power to the system.

In another aspect, the system may incorporate a 360-degree motion sensor. The 360-degree motion sensor can be accomplished by incorporating a series of motion sensors about each of the sides of the monitor enclosure. The 360-degree motion sensor can be assembled to a top surface of the monitor enclosure.

In another aspect, the system can incorporate a gas sensor.

In another aspect, the portable monitoring apparatus further comprises a battery charger for converting A/C power to D/C power and properly charging the battery.

In another aspect, the portable monitoring apparatus further comprises a power transformer for converting A/C power to D/C power.

In another aspect, the portable monitoring apparatus further comprises a relay bank providing in signal communication between the system controller and any of the functional output or communication components.

In another aspect, the portable monitoring apparatus further comprises an operational control switch, wherein the operational control switch creates and breaks a circuit between the power source and the system controller.

In another aspect, the at least one alert is at least one of an audible alert, a visual alert, and a remote notification apparatus.

In another aspect, the remote notification apparatus is at least one of an automatic dialer in signal communication with a telephone jack, a wireless modem, a wireless telephone, and the like.

In another aspect, the monitor enclosure further comprises a moveable monitor enclosure top, the monitor enclosure top providing access to the monitor enclosure interior. The moveable monitor enclosure top can be hingeably coupled to the monitor enclosure sidewall.

In another aspect, the audible alert is a siren.

In another aspect, the visual alert is a light. The light can be solid, strobing, flashing, rotating, color changing, projecting, and the like. The light is located on at least one of an exterior of the monitor enclosure and an exterior of the alerting enclosure.

In another aspect, the system further comprises a remote monitoring system, wherein the output of the various monitors are transmitted to a remote monitoring station using a wired or wireless communication interface.

The present disclosure is further directed to a method of using a portable hazardous conditions warning system, the method comprising the steps of:

A method of using a portable hazardous conditions warning system, the method comprising the steps of:

obtaining a primary portable monitoring apparatus, said primary portable monitoring apparatus comprising:

a monitor enclosure comprising a contiguous wall extending upwards from a base, said contiguous wall and base forming a monitoring enclosure interior, a power input element including a power distribution network providing power to said system, wherein said power input element is carried by said monitor enclosure, a system controller carried by said monitor enclosure, at least one motion detector in signal communication with said system controller, wherein said at least one motion detector is carried by said monitor enclosure, at least one monitor apparatus based alerting member in signal communication with said system controller, wherein said at least one monitor apparatus based alerting member is carried by said monitor enclosure, a monitor remote connection interface in signal communication with said system controller;

obtaining at least one remote portable alerting apparatus, each remote portable alerting apparatus comprising:

an alert enclosure comprising a contiguous wall extending upwards from a base, said contiguous wall and base forming an alert enclosure interior, an alert remote connection interface for receiving signal communication from said monitor remote connection, and at least one alerting apparatus based alerting member in signal communication with said alert remote connection, wherein said at least one alerting member is carried by said alert enclosure;

placing said primary portable monitoring apparatus in a location within an interior of a structure prior to incurring a hazardous process, said primary portable monitoring apparatus being positioned to optimize monitoring of any motion within said structure;

placing said remote portable alerting apparatus at a location external to said structure;

providing a signal communication between said primary portable monitoring apparatus and said remote portable alerting apparatus;

activating said primary portable monitoring apparatus;

initiating a hazardous process upon a structure;

monitoring said structure for any motion; and upon detection of any motion within said structure, activating said at least one alert of each of said primary portable monitoring apparatus and said remote portable alerting apparatus to warn of at least one of a potential living animal and an individual located within said structure.

These and other features, aspects, and advantages of the invention will be further understood and appreciated by those skilled in the art by reference to the following written specification, claims and appended drawings.

BRIEF DESCRIPTION OF THE DRAWINGS

The invention will now be described, by way of example, with reference to the accompanying drawings, where like numerals denote like elements and in which.

Like reference numerals refer to like parts throughout the various views of the drawings.

DETAILED DESCRIPTION OF THE INVENTION

Figure 1:
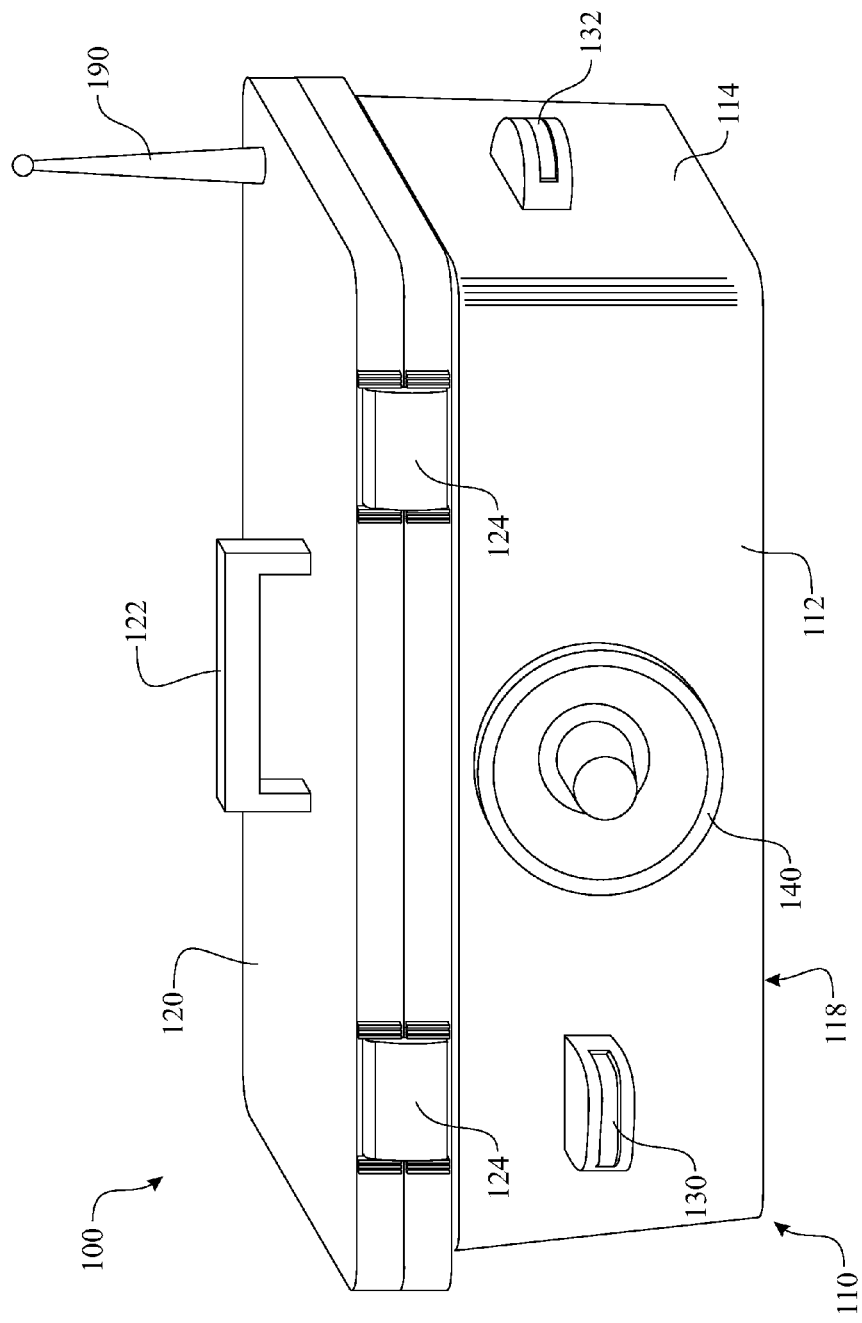
FIG. 1 presents an isometric view of an exemplary primary portable monitoring apparatus.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
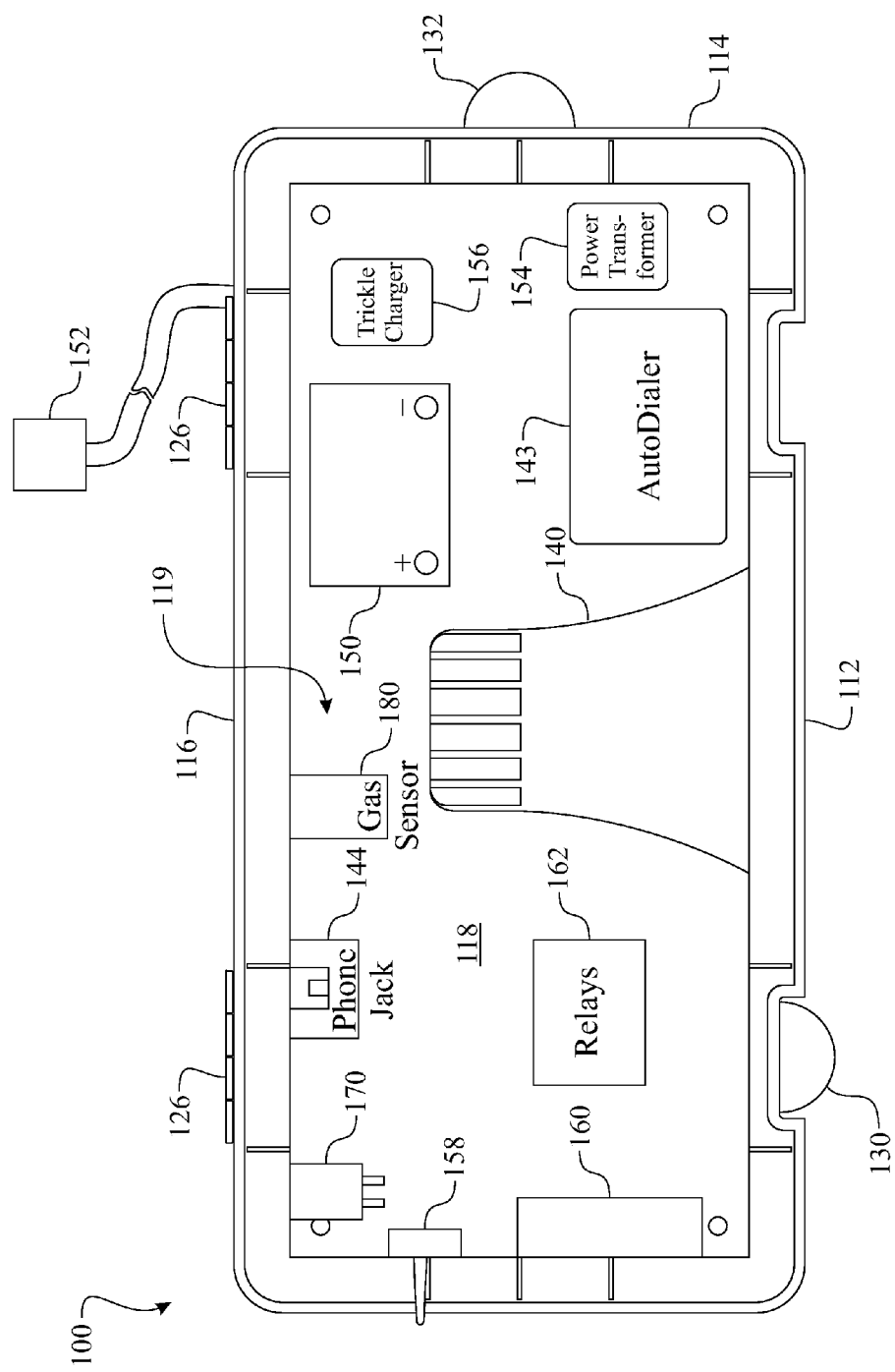
FIG. 2 presents a top view of the primary portable monitoring apparatus introduced in FIG. 1, illustrated in an opened configuration exposing the operational components therein.
Figure 3:
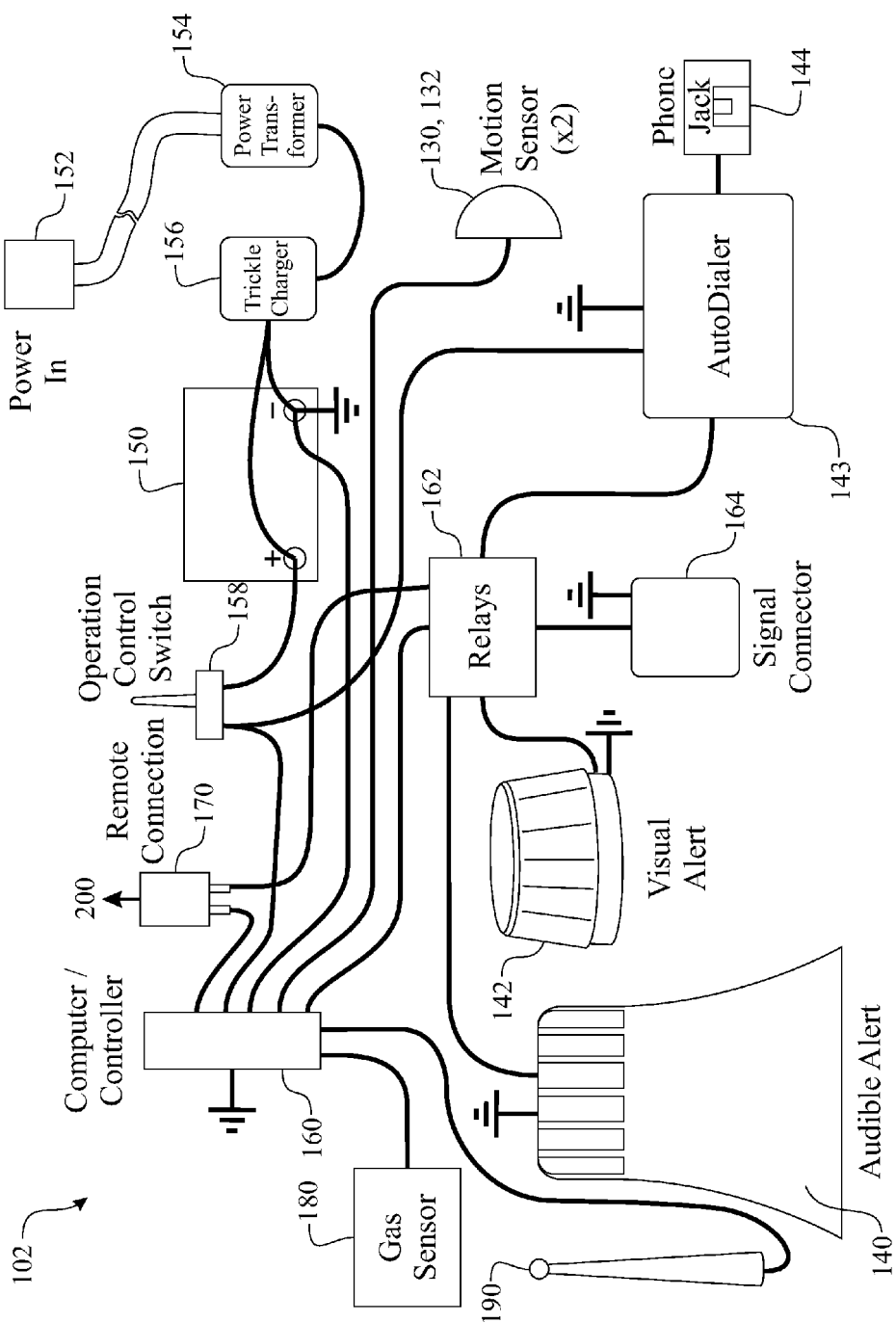
FIG. 3 presents an exemplary circuit arrangement of the operational components of the primary portable monitoring apparatus introduced in FIG. 1.
Figure 4:
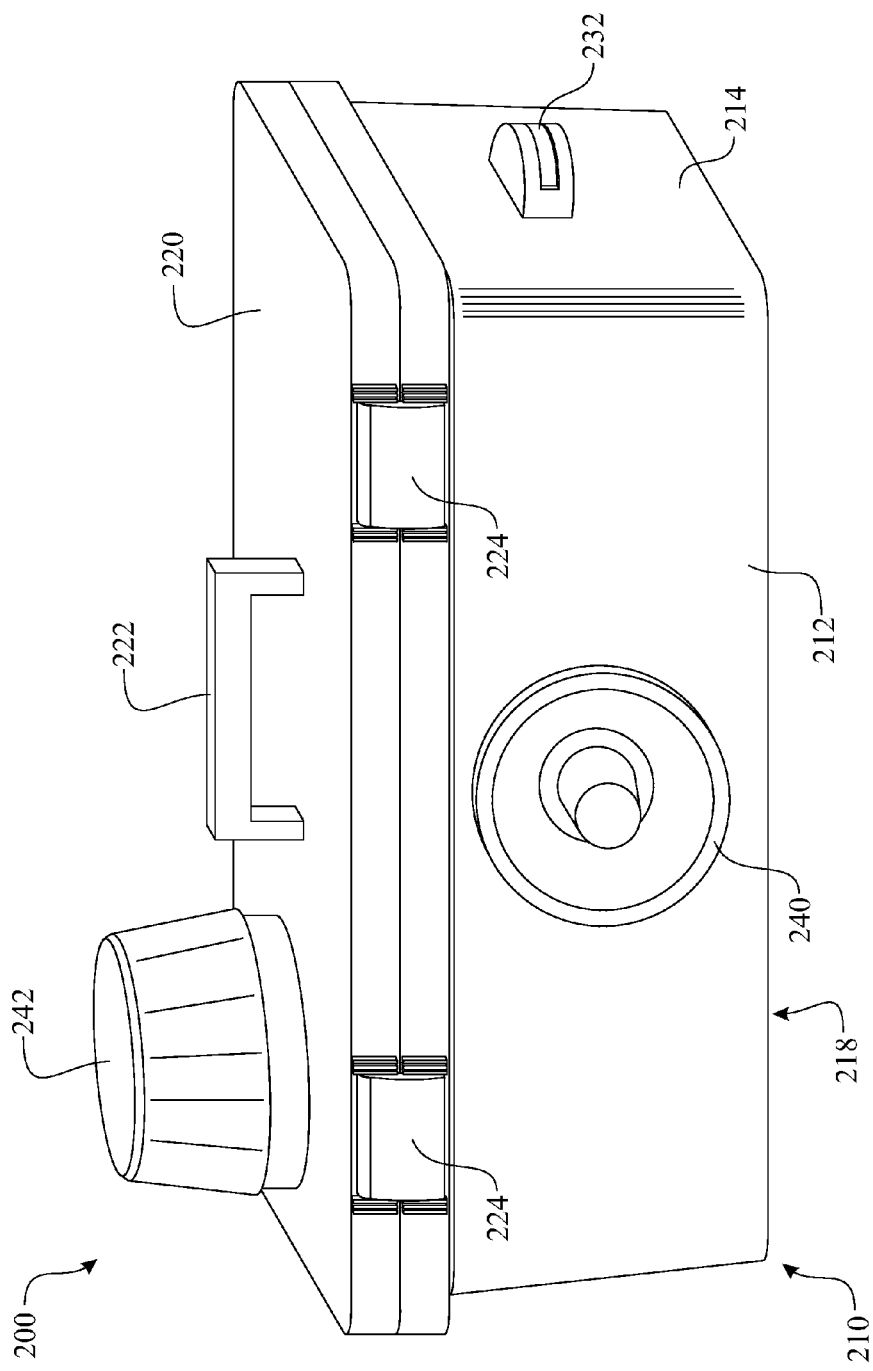
FIG. 4 presents an isometric view of an exemplary remote portable alerting apparatus.
Figure 5:
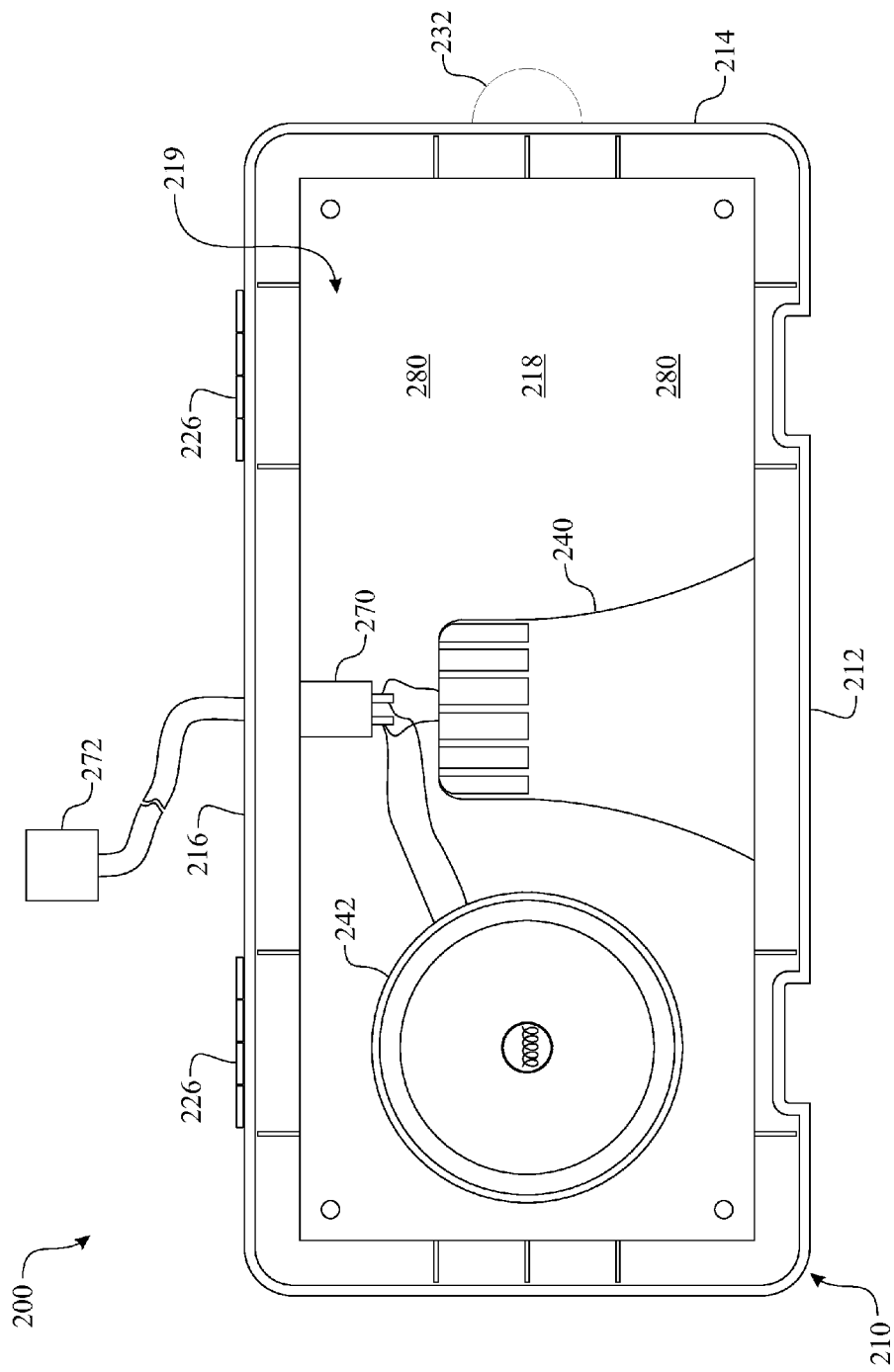
FIG. 5 presents a top view of the remote portable alerting apparatus introduced in FIG. 4, illustrated in an opened configuration exposing the operational components therein.

Residential and commercial structures are commonly subjected to hazardous processes, such as fumigation and demolition. The present invention provides a portable monitoring and alerting system to warn living animals and individuals that might be within harms way during the operation of the hazardous process. The portable monitoring and alerting system includes a primary portable monitoring apparatus 100 presented in FIGS. 1 through 3 and a remote portable alerting apparatus 200 presented in FIGS. 4 and 5.

The primary portable monitoring apparatus 100 includes a monitor enclosure 110 for retaining and protecting the components thereof. The monitor enclosure 110 is fabricated having a contiguous wall 112, 114, 116 extending upwards from an enclosure base 118, the contiguous wall 112, 114, 116 and the base 118 forming a monitoring enclosure interior 119. The monitor enclosure 110 further comprises an enclosure top 120 pivotally coupled to the enclosure rear wall 116 by at least one top mounting hinge 126. The enclosure top 120 is releasably secured in a closed configuration by at least one top clasp 124. An enclosure handle 122 can be attached to the enclosure top 120 or any other portion of the monitor enclosure 110, wherein the enclosure handle 122 aids the user in gripping and transporting the primary portable monitoring apparatus 100.

The operational portion of the primary portable monitoring apparatus 100 includes a system controller 160 assembled within the enclosure interior 119; at least one motion sensor 130, 132 affixed to at least one of the enclosure front wall 112, enclosure side walls 114, and enclosure rear wall 116; at least one alert, where in the exemplary alerts include an audible alert 140, a visual alert 142, and an auto dialer 143 in combination with a telephone jack 144; and a system controller 160. The motion sensor 130, 132 and alerts 140, 142, 143 are provided in signal communication with the system controller 160 forming an operational circuit. It is understood that the at least one motion sensor 130, 132 can be a 360-Degree sensor which would be mounted on a top surface of the primary portable monitoring apparatus 100. The at least one motion sensor 130, 132 can be mounted on a telescoping member enabling the user to raise the motion sensor 130, 132 to a desired height to improve the monitoring capabilities of the system.

Power is provided to the operational circuit through a power input cord 152 and/or a battery 150 forming an input power circuit. The input power circuit can include a trickle charger 156 located in electrical communication between the power input cord 152 and the battery 150. The trickle charger 156 continuously charges the battery 150 ensuring the battery 150 remains at maximum capacity, thus optimizing the operational time should power to the power input cord 152 become terminated. A power transformer 154 can be integrated in electrical communication with the power input cord 152 providing a conversion from alternating current to direct current. It is noted that a second power transformer 154 can be integrated into the operational circuitry at a location after the battery 150, the second power transformer 154 providing a conversion from direct current to alternating current if needed.

One or more optional gas sensors 180 can be integrated into the circuit. The gas sensors can be provided to detect any toxic gases that would be suspected to be present during the processing of the structure.

Operation of the primary portable monitoring apparatus 100 is controlled by a power switch 158, wherein the power switch 158 is located in a circuit between the battery 150 and the system controller 160. The power switch 158 toggles between a closed circuit and an open circuit, wherein the system is operational when the power switch 158 is in a closed circuit configuration. It is noted that the function of the trickle charger is preferably independent of the status of the power switch 158.

When the operational circuit is active, the motion sensors 130, 132 monitor the area for movement. The motion sensor 130, 132 are considered exemplary, wherein any monitoring device may be utilized to determine if any living animals or individuals are in the vicinity of the primary portable monitoring apparatus 100. The motion sensor 130, 132 are in signal communication with the system controller 160. The system controller 160 continuously monitors the output status of the motion sensor 130, 132 to determine if any living animals or individuals are in the vicinity of the primary portable monitoring apparatus 100. When the system controller 160 determines that living animals or individuals are in the vicinity of the primary portable monitoring apparatus 100, the system controller 160 emits a signal to the alerting device or devices. A relay bank 162 can be integrated into the operational circuit, wherein the relay bank 162 is inserted between the system controller 160 and any or all of the alerting devices.

The alerting device or devices can include an audible alert 140, a visual alert 142, and an auto dialer 143 in combination with a telephone jack 144. The exemplary audible alert 140 is a horn or siren. The audible alert 140 is preferably assembled to a wall 112, 114, 116 of the monitor enclosure 110, wherein the audible alert 140 is oriented with the sound pressure wave generating portion being located external to the monitor enclosure 110. The visual alert 142 can be any illuminating device, including a solid light, a strobing light, a flashing light, a rotating light, a color changing light, a projecting light, and the like. The illuminating source can be of any known form factor, including incandescent bulbs, light emitting diodes (LEDS), florescent bulbs, strobe lights, and the like or any combination thereof. The illuminating source can include lights or lenses of one or more colors or include any color changing configuration. The color changing configuration can include color changing LED's, a rotating lens having a plurality of color translucent panels, rotating the illumination source past a lens having a plurality of color translucent segments, and the like. The light is located on at least one of an exterior of the monitor enclosure and an exterior of the alerting enclosure. The audible alert 140 and/or the visual alert 142 can be permanently affixed or detachably coupled to the monitor enclosure 110. The detachable system enables the user to position the alerting elements 140, 142 at desired locations independent of the optional location of the primary monitoring apparatus 100.

A remote notification system, such as the auto dialer 143 in combination with a telephone jack 144 or other device can be integrated into the operational circuit. The auto dialer 143 includes a programmable index of one or more contact numbers. When alerting, the operational circuit directs the auto dialer 143 to automatically dial one or more of the preprogrammed contact numbers and, upon connection, conveys a respective message. A telephone landline is connected to the telephone jack 144, providing wired connectivity to a telephone network. The auto dialer 143 can include wireless communications either in combination with or replacing the telephone jack 144.

Figure 6:
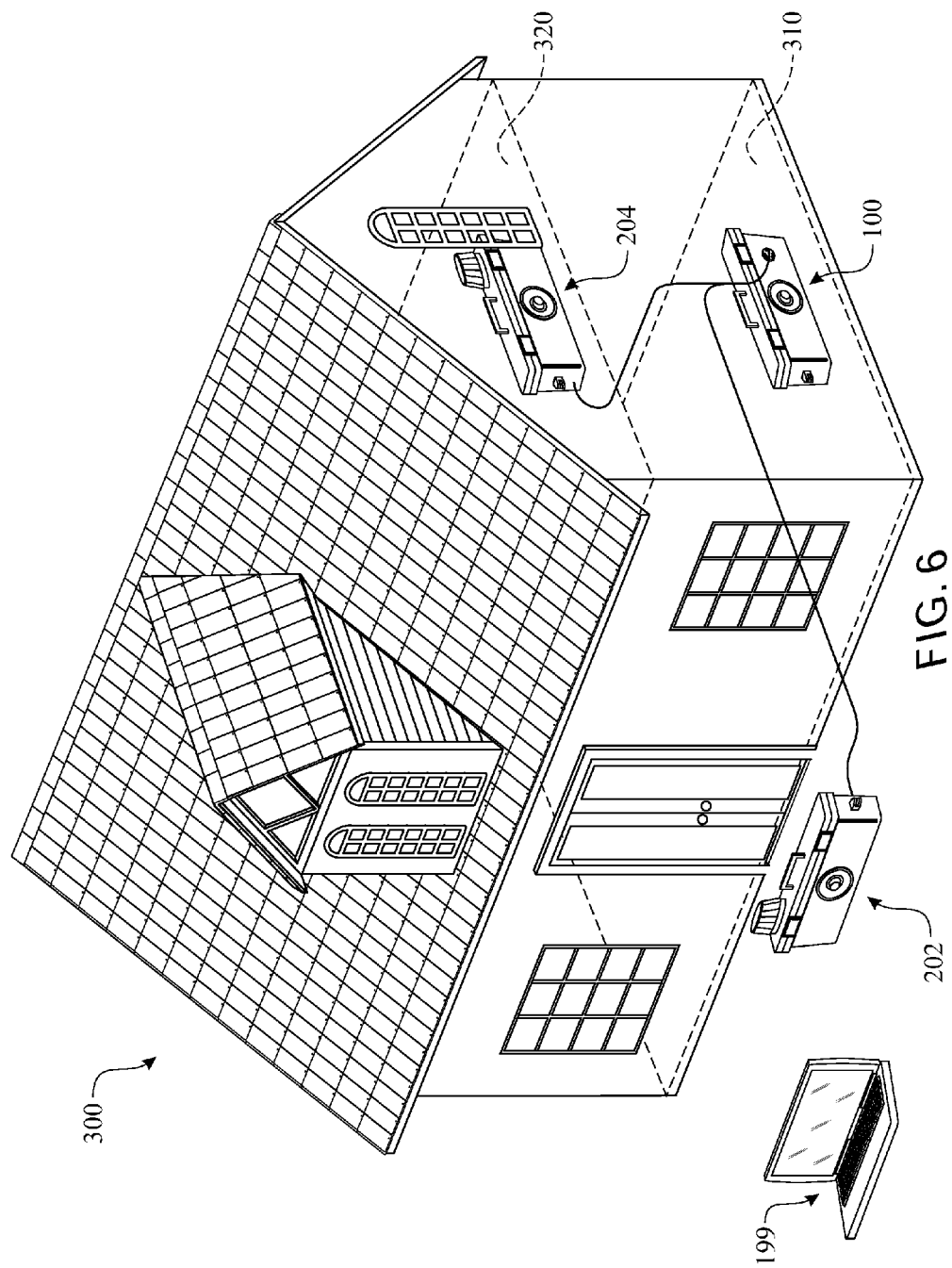
FIG. 6 presents an isometric view of a first exemplary application of the portable monitoring and alerting system.

The 100# can further comprise a wireless communication interface 190, which can communicate to a remote monitoring station 199 (FIG. 6). The wireless communication interface 190 is representative of a wired or wireless communication interface, which provides a communication interface to transfer data between the portable monitoring apparatus 100, 200 and the remote monitoring station 199. This provides a method for informing a monitoring party of the status of the portable monitoring apparatus 100, 200. The remote monitoring station 199 can be any form factor, including a personal computer, a laptop computer (illustrated), a tablet computing device, a cellular telephone, a personal data assistant (PDA), a custom data reception device, and the like.

Similar to the primary portable monitoring apparatus 100, the remote portable alerting apparatus 200 includes a monitor enclosure 210 for retaining and protecting the components thereof. Details of the remote portable alerting apparatus 200 are presented in FIGS. 4 and 5. Like features of remote portable alerting apparatus 200 and primary portable monitoring apparatus 100 are numbered the same except preceded by the numeral '2'. The monitor enclosure 210 can be similarly sized and shaped or distinctly sized and shaped respective to the monitor enclosure 110.

The operational portion of the remote portable alerting apparatus 200 includes at least one alert, where in the exemplary alerts include an audible alert 240 and a visual alert 242. A circuit is providing connecting the at least one alert 240, 242 with a signal input connector 270, wherein the signal input connector 270 is provided to receive a signal input from the signal output connector 164, 170 of the primary portable monitoring apparatus 100 via a signal conveyance cable 272. The signal input includes sufficient power to drive the alert. Although hardwired signal interconnectivity is preferred, it is understood that the remote portable alerting apparatus 200 may include an optional wireless signal communication interface. The wireless signal communication interface would include a battery 150, a wireless receiver for receiving a wirelessly communicated alert signal, and a driver for activating the at least one alert 240, 242. Additionally, a wireless transmitter would be integrated into the operational circuit of the primary portable monitoring apparatus 100.

One or more stabilizing weights 280 may be placed within an enclosure base 218 of the monitor enclosure 210. The stabilizing weights 280 are inserted to retain the remote portable alerting apparatus 200 in location. The stabilizing weights 280 may be a brick, a rock, a sandbag, a lead block or any other dense object.

It is understood that the remote portable alerting apparatus 200 may include additional elements provided in the primary portable monitoring apparatus 100. A motion sensor 232 can be optionally integrated into the remote portable alerting apparatus 200, providing one or more additional motion monitoring sensors to monitor additional areas of the structure. The motion sensor 232 may be combined with other components of the monitoring circuit of the primary portable monitoring apparatus 100, including a system controller 160. Alternatively, the circuit of remote portable alerting apparatus 200 can be provided in signal communication with the operational circuit of the primary portable monitoring apparatus 100, sharing the functions thereof.

The primary portable monitoring apparatus 100 and remote portable alerting apparatus 200 can be deployed in any environment being subjected to a hazardous condition. Two exemplary applications are presented herein: (1) a residential structure proposed for fumigation and (2) a commercial structure proposed for demolition.

An exemplary structure undergoing treatment 300, undergoing preparation for fumigation, is presented in FIG. 6. A primary portable monitoring apparatus 100 is positioned in an open area of a ground floor 310 to monitor the ground floor 310 for any movement, wherein the movement is interpreted as an individual or animal. A first remote portable alerting apparatus 200, referenced as remote portable alerting apparatus 202, is placed external to the structure undergoing treatment 300. If desired, a second remote portable alerting apparatus 200, referenced as remote portable alerting apparatus 204, can be placed within the structure undergoing treatment 300. In the exemplary illustration, it is desired to include the remote portable alerting apparatus 204 to enable monitoring of and alerting for an upper floor 320. It is understood that a plurality of remote portable alerting apparatus 204 can be deployed within the structure undergoing treatment 300 to ensure adequate coverage for both monitoring for any life and alerting the life of any pending danger.

In operation, the deployed primary portable monitoring apparatus 100 is activated. The motion sensor 130, 132 monitors for any motion. The motion is interpreted as being a result of an individual or animal within the structure undergoing treatment 300.

The system would be activated prior to injecting poisonous gases into the covered and/or sealed structure undergoing treatment 300. The primary portable monitoring apparatus 100 and remote portable alerting apparatus 200 are integrated providing signal communication therebetween. The primary portable monitoring apparatus 100 is activated to initiate monitoring of the region for any individuals or animals that may be in the proximity of or within the structure undergoing treatment 300. The structure undergoing treatment 300 is subjected to the hazardous condition. In the exemplary application, the fumigation process initiates with injection of poisonous gases into the covered and/or sealed structure undergoing treatment 300. When the motion sensor 130, 132 detects motion, the system controller 160 activates the at least one alert, including the audible alert 140, the visual alert 142, and/or a remote notification using the combination of the auto dialer 143 and telephone jack 144. The remote notification can alternatively or additionally utilize a wireless transmission to a predetermined receiving device. This can include a cellular telephone, a pager, an email address, a Short Message System transmission (SMS), a twitter message, a radio message, and the like. The transmissions can be audible, digital, and the like, or any combination thereof. The warning signal is designed to alert individuals within the structure of the pending danger, ward off any animals that might have strayed in the structure or area, and alert any associated authorities overseeing the hazardous process. Notification of the associated authorities enables them to inspect the structure undergoing treatment 300 for any individuals or animals in the vicinity.

Figure 7:
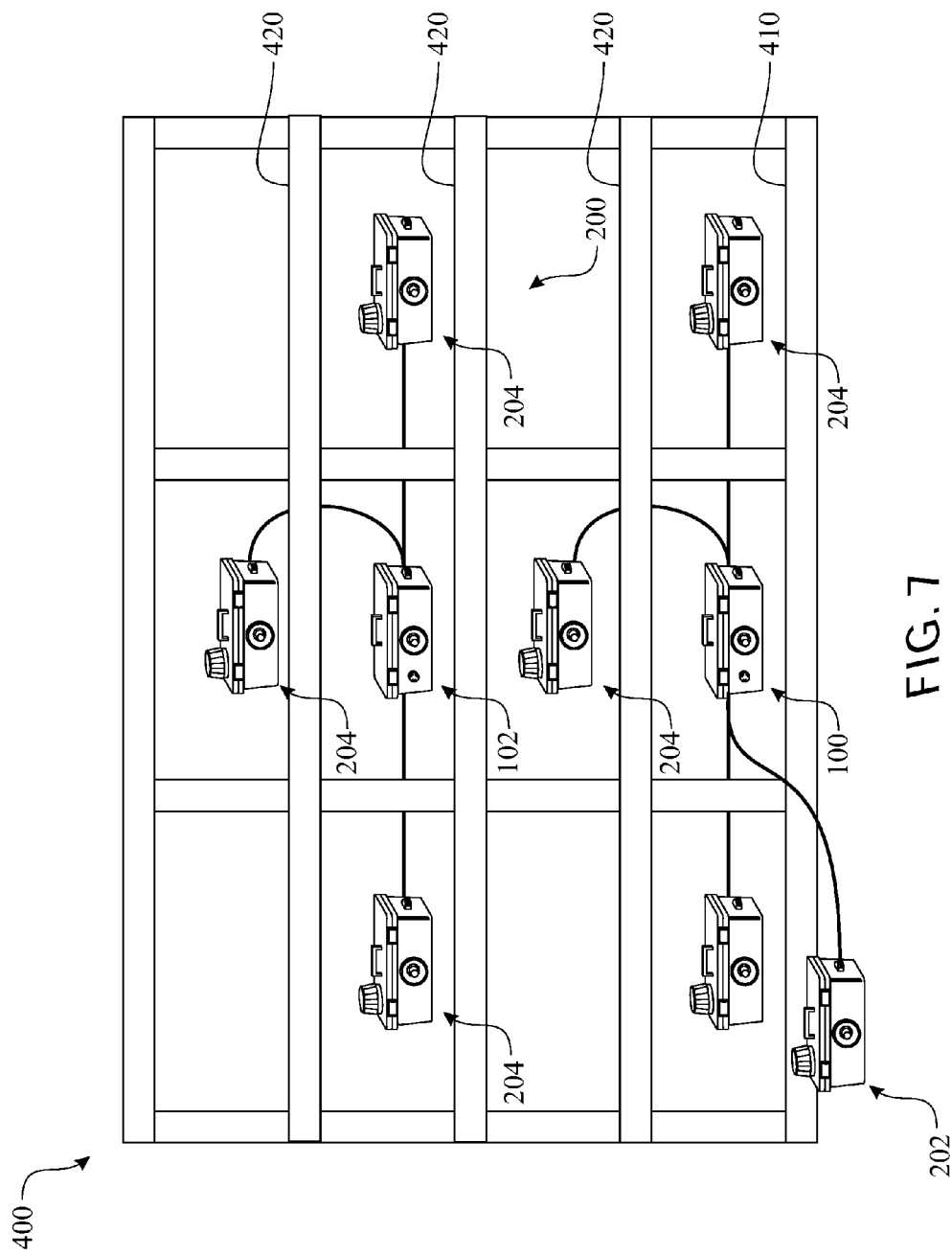
FIG. 7 presents an isometric view of a second exemplary application of the portable monitoring and alerting system.

An exemplary structure subject for demolition 400, undergoing preparation for demolition, is presented in FIG. 7. A primary portable monitoring apparatus 100 is positioned in an open area of a ground floor 410 to monitor the ground floor 410 for any movement, wherein the movement is interpreted as an individual or animal. A first remote portable alerting apparatus 200, referenced as remote portable alerting apparatus 202, is placed external to the structure subject for demolition 400. If desired, a second remote portable alerting apparatus 200, referenced as remote portable alerting apparatus 204, can be placed within the general remaining boundaries of the structure subject for demolition 400. In the exemplary illustration, it is desired to include the remote portable alerting apparatus 204 to enable monitoring of and alerting for each of the upper floors 420. A plurality of remote portable alerting apparatus 204 can be deployed within the structure subject for demolition 400 as illustrated, to ensure adequate coverage for both monitoring for any life and alerting the life of any pending danger. A second primary portable monitoring apparatus 100, referenced as remote portable alerting apparatus 102, can be deployed within the structure subject for demolition 400 to further enhance the monitoring and alerting system.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:
1. A method of using a portable hazardous conditions warning system, the method comprising the steps of:
obtaining a primary portable monitoring apparatus, said primary portable monitoring apparatus comprising:
a monitor enclosure comprising a contiguous wall extending upwards from a base, said contiguous wall and base forming a monitoring enclosure interior, a power input element including a power distribution network providing power to said system, wherein said power input element is carried by said monitor enclosure, a system controller carried by said monitor enclosure, at least one motion detector in signal communication with said system controller wherein said at least one motion detector is carried by said monitor enclosure, a monitor remote connection interface in signal communication with said system controller wherein said monitor remote connection interface is carried by said monitor enclosure;

obtaining at least one remote portable alerting apparatus, each remote portable alerting apparatus comprising:

an alert enclosure comprising a contiguous wall extending upwards from a base, said contiguous wall and base forming an alert enclosure interior, an alert remote connection interface for receiving signal communication from said monitor remote connection interface, wherein said alert remote connection interface is carried by said alert enclosure, and at least one alerting member in signal communication with said alert remote connection interface, wherein said at least one alerting member is carried by said alert enclosure;

placing said primary portable monitoring apparatus in a location within an interior of a structure prior to incurring a hazardous process, said primary portable monitoring apparatus being positioned to optimize monitoring of any motion within said structure, wherein a desired condition is where said structure interior is free of any living animals and individuals;

placing said remote portable alerting apparatus at a location external to said structure, wherein said remote portable alerting apparatus is utilized to alert a monitoring party of an undesirable condition, wherein the monitoring party is located external to the structure;

providing a signal communication between said primary portable monitoring apparatus and said remote portable alerting apparatus;

activating said primary portable monitoring apparatus prior to initiating a planned hazardous process;

initiating said planned hazardous process upon a structure;

monitoring said structure for any motion of at least one of said living animal and said individual located within said structure during execution of said planned hazardous process, wherein the step of monitoring is accomplished by said at least one motion detector; and upon detection of any motion of at least one of said living animal and said individual located within said structure during execution of said planned hazardous process by said at least one motion detector, activating each of said at least one remote portable alerting apparatus to warn a monitoring party of at least one of a living animal and an individual located within said structure.

2. A method of using a portable hazardous conditions warning system as recited in claim 1, the method further comprising the step of:

fumigating an interior of said structure by injecting poisonous gases into said structure.

3. A method of using a portable hazardous conditions warning system as recited in claim 1, the method further comprising the step of:

subjection said structure to demolition.

4. A method of using a portable hazardous conditions warning system as recited in claim 1, the method further comprising the step of:

alerting a remote party that said detection of motion within said structure has been identified, wherein said alerting process is accomplished using a wireless transmitting protocol.

5. A method of using a portable hazardous conditions warning system as recited in claim 1, the method further comprising the step of:

alerting a party located external and in a vicinity of said building that said detection of motion within said structure has been identified, wherein said alerting process is accomplished using at least one of a visual alert and an audible alert.

6. A method of using a portable hazardous conditions warning system as recited in claim 1, the method further comprising the step of:

communicating between said primary portable monitoring apparatus and each of said at least one remote portable alerting apparatus by a wired interface.

7. A method of using a portable hazardous conditions warning system as recited in claim 1, the method further comprising the step of:

remotely activating said portable hazardous conditions warning system using at least one of a wired remote control and a wireless remote control.

8. A method of using a portable hazardous conditions warning system, the method comprising the steps of:

obtaining a primary portable monitoring apparatus, said primary portable monitoring apparatus comprising:

a monitor enclosure comprising a contiguous wall extending upwards from a base, said contiguous wall and base forming a monitoring enclosure interior, a power input element including a power distribution network providing power to said system, wherein said power input element is carried by said monitor enclosure, a system controller carried by said monitor enclosure, at least one motion detector in signal communication with said system controller, wherein said at least one motion detector is carried by said monitor enclosure, at least one monitor apparatus based alerting member in signal communication with said system controller, wherein said at least one monitor apparatus based alerting member is carried by said monitor enclosure, a monitor remote connection interface in signal communication with said system controller;

obtaining at least one remote portable alerting apparatus, each remote portable alerting apparatus comprising:

an alert enclosure comprising a contiguous wall extending upwards from a base, said contiguous wall and base forming an alert enclosure interior, an alert remote connection interface for receiving signal communication from said monitor remote connection interface, and at least one alerting apparatus based alerting member in signal communication with said alert remote connection interface, wherein said at least one alerting member is carried by said alert enclosure;

placing said primary portable monitoring apparatus in a location within an interior of a structure prior to incurring a hazardous process, said primary portable monitoring apparatus being positioned to optimize monitoring of any motion within said structure, wherein a desired condition is where said structure interior is free of any living animals and individuals;

placing said remote portable alerting apparatus at a location external to said structure, wherein said remote portable alerting apparatus is utilized to alert a monitoring party of an undesirable condition, wherein the monitoring party is located external to the structure;

providing a signal communication between said primary portable monitoring apparatus and said remote portable alerting apparatus;

activating said primary portable monitoring apparatus prior to initiating a planned hazardous process;

initiating said planned hazardous process upon a structure;

monitoring said structure for any motion of at least one of said living animal and said individual located within said structure during execution of said planned hazardous process; and upon detection of any motion of at least one of said living animal and said individual located within said structure during execution of said planned hazardous process, activating each of said at least one remote portable alerting apparatus to warn a monitoring party of at least one of a living animal and an individual located within said structure.

9. A method of using a portable hazardous conditions warning system as recited in claim 8, the method further comprising the step of:

fumigating an interior of said structure by injecting poisonous gases into said structure.

10. A method of using a portable hazardous conditions warning system as recited in claim 8, the method further comprising the step of:

subjection said structure to demolition.

11. A method of using a portable hazardous conditions warning system as recited in claim 8, the method further comprising the step of:

alerting a remote party that said detection of motion within said structure has been identified, wherein said alerting process is accomplished using a wireless transmitting protocol.

12. A method of using a portable hazardous conditions warning system as recited in claim 8, the method further comprising the step of:

alerting a party located external and in a vicinity of said building that said detection of motion within said structure has been identified, wherein said alerting process is accomplished using at least one of a visual alert and an audible alert.

13. A method of using a portable hazardous conditions warning system as recited in claim 8, the method further comprising the step of:

communicating between said primary portable monitoring apparatus and each of said at least one remote portable alerting apparatus by a wired interface.

14. A method of using a portable hazardous conditions warning system as recited in claim 8, the method further comprising the step of:

remotely activating said portable hazardous conditions warning system using at least one of a wired remote control and a wireless remote control.

15. A method of using a portable hazardous conditions warning system, the method comprising the steps of:

obtaining a primary portable monitoring apparatus, said primary portable monitoring apparatus comprising:

a monitor enclosure comprising a contiguous wall extending upwards from a base, said contiguous wall and base forming a monitoring enclosure interior, a power input element including a power distribution network providing power to said system, wherein said power input element is carried by said monitor enclosure, a portable power supply in electrical communication with said power input element, wherein said portable power supply is carried by said monitor enclosure, a system controller carried by said monitor enclosure, at least one motion detector in signal communication with said system controller carried by said monitor enclosure, a monitor remote connection interface in signal communication with said system controller carried by said monitor enclosure;

obtaining at least one remote portable alerting apparatus, each remote portable alerting apparatus comprising:

an alert enclosure comprising a contiguous wall extending upwards from a base, said contiguous wall and base forming an alert enclosure interior, an alert remote connection interface for receiving signal communication from said monitor remote connection interface carried by said alert enclosure, and at least one alerting member in signal communication with said alert remote connection interface, wherein said at least one alerting member is carried by said alert enclosure;

placing said primary portable monitoring apparatus in a location within an interior of a structure prior to incurring a hazardous process, said primary portable monitoring apparatus being positioned to optimize monitoring of any motion within said structure, wherein a desired condition is where said structure interior is free of any living animals and individuals;

placing said remote portable alerting apparatus at a location external to said structure, wherein said remote portable alerting apparatus is utilized to alert a monitoring party of an undesirable condition, wherein the monitoring party is located external to the structure;

placing said remote portable alerting apparatus at a location external to said structure;

providing a signal communication between said primary portable monitoring apparatus and said remote portable alerting apparatus;

activating said primary portable monitoring apparatus prior to initiating a planned hazardous process;

initiating said planned hazardous process upon a structure;

monitoring said structure for any motion of at least one of said living animal and said individual located within said structure during execution of said planned hazardous process; and upon detection of any motion of at least one of said living animal and said individual located within said structure during execution of said planned hazardous process, activating each of said at least one remote portable alerting apparatus to warn a monitoring party of at least one of a living animal and an individual located within said structure.

16. A method of using a portable hazardous conditions warning system as recited in claim 15, the method further comprising the step of:

fumigating an interior of said structure by injecting poisonous gases into said structure.

17. A method of using a portable hazardous conditions warning system as recited in claim 15, the method further comprising the step of:

subjection said structure to demolition.

18. A method of using a portable hazardous conditions warning system as recited in claim 15, the method further comprising the step of:

alerting a remote party that said detection of motion within said structure has been identified, wherein said alerting process is accomplished using a wireless transmitting protocol.

19. A method of using a portable hazardous conditions warning system as recited in claim 15, the method further comprising the step of:

alerting a party located external and in a vicinity of said building that said detection of motion within said structure has been identified, wherein said alerting process is accomplished using at least one of a visual alert and an audible alert.

20. A method of using a portable hazardous conditions warning system as recited in claim 15, the method further comprising the step of:

remotely activating said portable hazardous conditions warning system using at least one of a wired remote control and a wireless remote control.

* * * * *